US008503854B2

(12) United States Patent
Suga

(10) Patent No.: US 8,503,854 B2
(45) Date of Patent: Aug. 6, 2013

(54) PLAYBACK APPARATUS AND METHOD OF CONTROLLING THE SAME

(75) Inventor: Kazumi Suga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 12/377,973

(22) PCT Filed: Oct. 1, 2007

(86) PCT No.: PCT/JP2007/069533
§ 371 (c)(1),
(2), (4) Date: Feb. 18, 2009

(87) PCT Pub. No.: WO2008/053665
PCT Pub. Date: May 8, 2008

(65) Prior Publication Data
US 2010/0232759 A1    Sep. 16, 2010

(30) Foreign Application Priority Data

Oct. 24, 2006   (JP) .................................. 2006-289199

(51) Int. Cl.
*H04N 5/765*    (2006.01)
*H04N 9/80*    (2006.01)

(52) U.S. Cl.
USPC .............................. 386/46; 386/200; 386/248

(58) Field of Classification Search
USPC .......................................... 386/46, 200, 248
See application file for complete search history.

(56) References Cited

U.S. PATENT DOCUMENTS

| | | | |
|---|---|---|---|
| 6,652,174 B1 * | 11/2003 | Mann et al. ................... | 400/691 |
| 6,791,624 B1 | 9/2004 | Suga ............................. | 348/588 |
| 7,016,706 B2 | 3/2006 | Kurokawa et al. | |
| 2002/0188663 A1 | 12/2002 | Islam et al. ................... | 709/202 |
| 2003/0097659 A1 | 5/2003 | Goldman ......................... | 725/89 |
| 2003/0137603 A1 | 7/2003 | Suga ............................. | 348/553 |
| 2003/0142342 A1 * | 7/2003 | Simpson et al. ............. | 358/1.15 |
| 2005/0071870 A1 | 3/2005 | Miyamoto et al. .............. | 725/46 |
| 2005/0231639 A1 | 10/2005 | Kubota et al. ................. | 348/552 |
| 2007/0168884 A1 * | 7/2007 | Weeks et al. .................. | 715/847 |
| 2007/0174894 A1 | 7/2007 | Matsunaga | |
| 2007/0253676 A1 * | 11/2007 | Roh ............................. | 386/94 |

FOREIGN PATENT DOCUMENTS

| | | | |
|---|---|---|---|
| JP | 07-212713 A | | 8/1995 |
| JP | 411018076 | * | 6/1997 |
| JP | 2000-270293 A | | 9/2000 |

(Continued)

OTHER PUBLICATIONS

Durda, F., "Centronics and IBM Compatible Parallel Printer Interface Pin Assignment Reference," http://nemesis.lonestar.org, 2001, 11 pages.*

*Primary Examiner* — Carl Colin
*Assistant Examiner* — John Elmore
(74) *Attorney, Agent, or Firm* — Fitzpatrick, Cella, Harper & Scinto

(57) ABSTRACT

In a video playback apparatus that is capable of communicating with a printing device, if an event of which notification is to be given has occurs in the printing device, a situation in which viewing by the user is impeded by the notification and a situation in which unnecessary video is recorded are suppressed. If an error occurs in the printing device, the type of display information prevailing when the error is detected is discriminated (S34). In case of a moving-picture program broadcast, an error message is displayed and the display information starts being stored (S35), thereby making it possible to resume viewing after error recovery. On the hand, in the case of a still picture or other type of display information, an error message is displayed (S310) without storing display information, thereby suppressing unnecessary recording of display information.

16 Claims, 16 Drawing Sheets

(56) References Cited

FOREIGN PATENT DOCUMENTS

| | | |
|---|---|---|
| JP | 2003-67332 | 3/2003 |
| JP | 2003-152664 A | 5/2003 |
| JP | 2003-219353 | 7/2003 |
| JP | 2004-80195 A | 3/2004 |
| JP | 2005-311586 | 11/2005 |
| WO | WO 98/48566 | 10/1998 |
| WO | WO 02/03683 * | 1/2002 |
| WO | WO 02/03683 A2 | 10/2002 |

* cited by examiner

F I G. 8
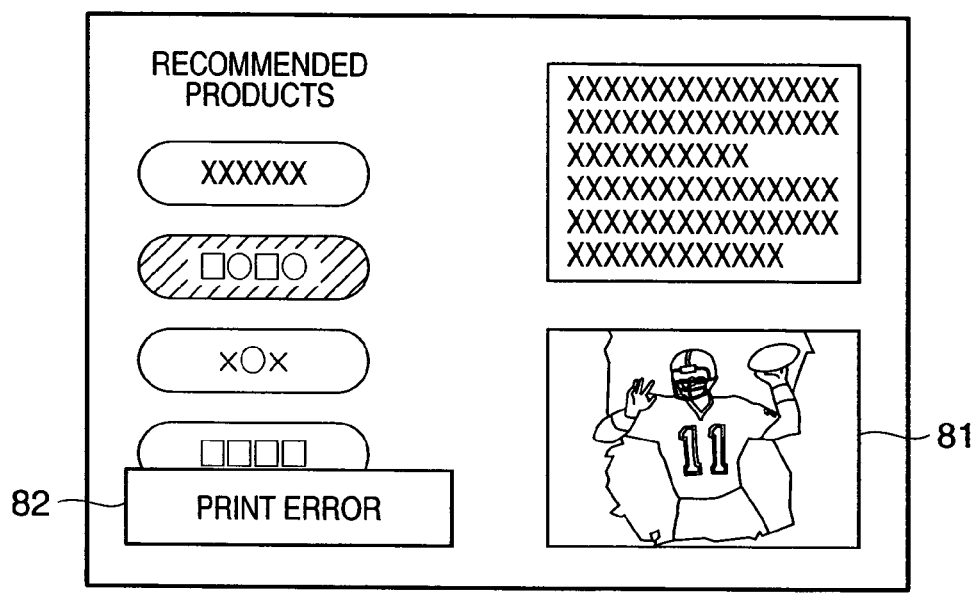

PLAYBACK APPARATUS AND METHOD OF CONTROLLING THE SAME

TECHNICAL FIELD

The present invention relates to a video playback apparatus and method of controlling the same. More particularly, the invention relates to a video playback apparatus to which a printing device is capable of being connected, and to a method of controlling this apparatus.

BACKGROUND ART

Television receivers, which are one example of a video playback apparatus, include those that are capable of print processing. Further, standards relating to print processing in television receivers have been defined by ARIB (Association of Radio Industries and Businesses) [ARIB STD-B24 Volume 2 "7.6.17 Functions for Printing" (Document 1) and Chapter APPENDIX 1-12 "Guidelines on Functions for Printing" (Document 2) and ARIB TR-B14 Volume 3 "Print Function" (Document 3)].

An API (Application Program Interface) of printing-related functions is defined as extended functions for broadcasting in Documents 1 and 2. Further, Documents 1 and 2 define operating procedures for the following three cases:

(1) a case where content for XHTML (eXtensible Hyper Text Markup Language)-format printing that a receiver has acquired from broadcast waves is transferred from the receiver to a printer;

(2) a case where information for acquiring content for printing from a receiver by a printer is transferred from the receiver to the printer; and (3) a case where a receiver captures an image and transfers the image to a printer.

Further, the format of print data and a method of presentation by a receiver are defined in Document 3.

For example, with regard to an event (paper jamming, no ink left, etc.) that occurs in a printer asynchronously with respect to a receiver, it is desired in terms of user convenience that the receiver present a display that notifies of the event that has occurred. Here it does not matter if a message or user interface displayed by the receiver is displayed at the same time as the broadcast picture. Further, although the details of operation for presenting such a display at the receiver are left to the manufacturer, it is desired that such a display be made as small as possible upon assuring user convenience. The reason is to limit situations in which program viewing is impeded by a display informing of occurrence of an event.

There are proposals for the purpose of mitigating the problem of impeded program viewing owing to display of a message concerning an event that has occurred in a printer. These proposals include one in which a message is α-blended and displayed on the screen of the TV program (Japanese Patent Application Laid-Open No. 2003-219353) and one in which it is possible for the user to change over the details contained in a message or to turn off the display (Japanese Patent Application Laid-Open No. 2005-311586).

On the other hand, Japanese Patent Application Laid-Open No. 2003-67332 discloses an arrangement where upon receiving an e-mail that has been permitted to be displayed even when viewing a separate program, the program is recorded on a storage device and the e-mail is displayed.

However, with the method described in Document 3 or Japanese Patent Application Laid-Open No. 2003-219353, program viewing is still impeded by the message although to a lesser degree. A further problem is that program viewing is impeded while an operation for restoring the printer from the error state to the normal state is in progress.

Further, a problem with the method described in Japanese Patent Application Laid-Open No. 2005-311586 is that an operation for changing the message display method must be performed by the user during the viewing of the TV program. This requires the user to manually carry out the operation. A further problem is that program viewing is impeded while an operation for restoring the printer from the error state to the normal state is in progress.

The method described in Japanese Patent Application Laid-Open No. 2003-67332 records the program unconditionally during the display of e-mail. The problem is that video that does not actually require recording, e.g., a still picture, also is recorded.

DISCLOSURE OF INVENTION

The present invention has been devised in view of these problems of the prior art. According to the present invention, in a video playback apparatus which is capable of communicating a printing device, even if an event of which occurrence should be notified has occurred in the printing device, inconveniences such as disruption of viewing by notifications and recording of unnecessary video are eliminated.

According to one aspect of the present invention, there is provided a video playback apparatus capable of outputting a video image for display and of storing video in a storage unit connected thereto, the apparatus comprises: state detecting means for detecting the state of a connected printing device; discriminating means for discriminating the type of video image for display; superimposing means for superimposing information, which indicates an event of which notification is to be given, on the video image for display; and control means which, when the state detecting means detects that an event of which notification is to be given has occurred in the printing device, is for starting the superimposing of the information using the superimposing means and storing the video image for display in the storage unit in accordance with the type of video image for display discriminated by the discriminating means.

According to another aspect of the present invention, there is provided a method of controlling a video playback apparatus capable of outputting a video image for display and of storing video in a storage unit connected thereto, the method comprises: a state detecting step of detecting the state of a connected printing device; a discriminating step of discriminating the type of video image for display; a superimposing step of superimposing information, which indicates an event of which notification is to be given, on the video image for display; and when it is detected at the state detecting step that an event of which notification is to be given has occurred in the printing device, a control step of starting the superimposing of the information using by the superimposing step and storing the video image for display in the storage unit in accordance with the type of video image for display discriminated at the discriminating step.

Further features of the present invention will become apparent from the following description of exemplary embodiments (with reference to the attached drawings).

BRIEF DESCRIPTION OF DRAWINGS

FIG. 8 is a diagram illustrating an example of display of an error message displayed by being superimposed on display information which is a mixture of still and moving pictures in the second embodiment of the present invention;

BEST MODE FOR CARRYING OUT THE INVENTION

Preferred embodiments of the present invention will now be described in detail in accordance with the accompanying drawings.

First Embodiment

Figure 1:
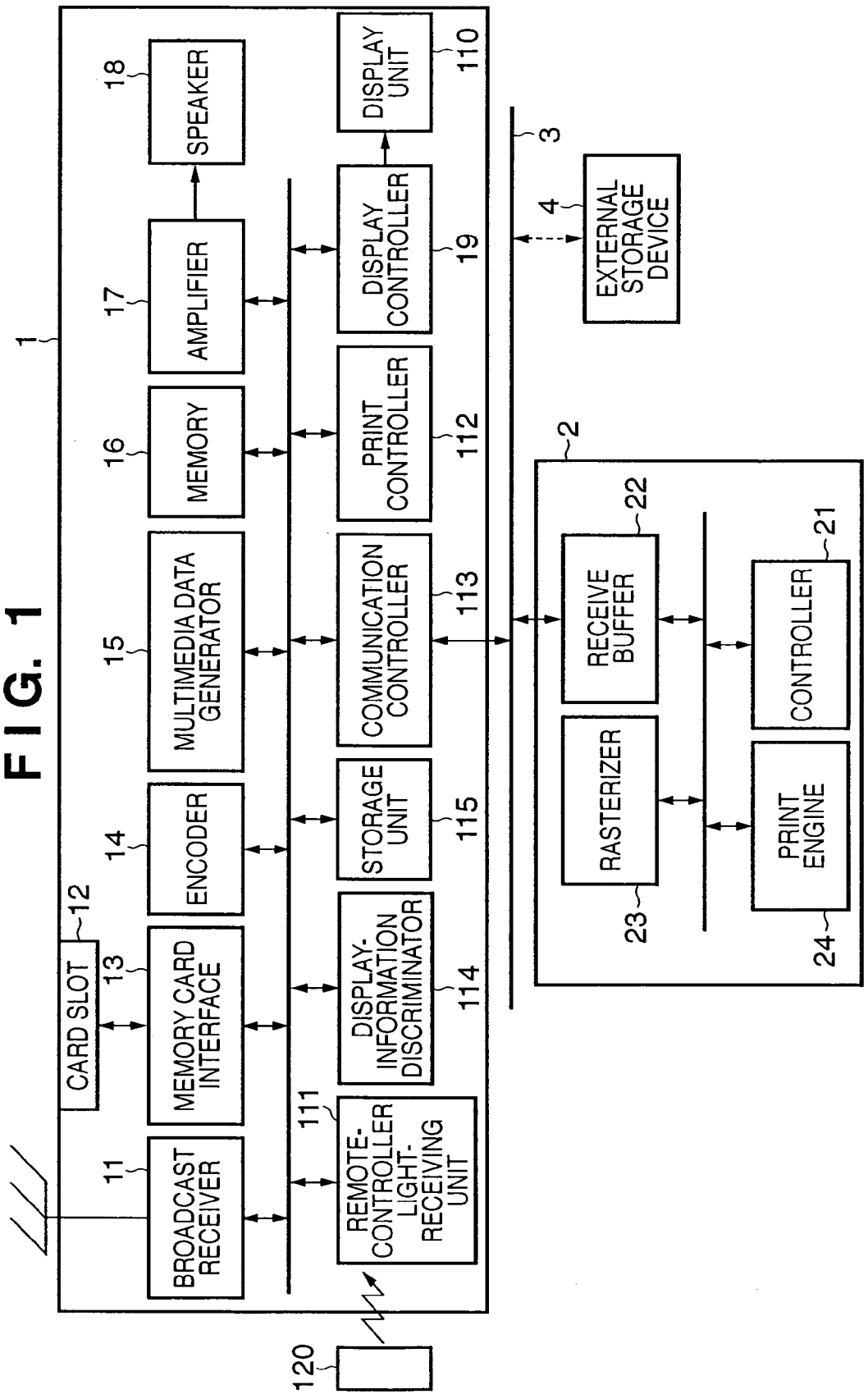
FIG. 1 is a block diagram illustrating an example of the configuration of a video playback system in which a television receiver 1, which is an example of a video playback apparatus according to first to third embodiments of the present invention, and a printing device 2 are connected so to be capable of communicating with each other.

FIG. 1 is a block diagram illustrating an example of the configuration of a video playback system in which a television receiver 1, which is an example of a video playback apparatus according to a first embodiment of the present invention, and a printing device 2 are connected so be capable of communicating with each other.

In FIG. 1, the television receiver 1 and printer 2 are connected by a communication medium 3. It should be noted that there is no limitation regarding the positional relationship between the television receiver 1 and printer 2. That is, the television receiver 1 and printer 2 may be incorporated within the same case or may have separate cases of their own. In the former case, reference number 3 denotes an internal bus. In the latter case, reference number 3 denotes a network such as a LAN (Local Area Network), a multimedia interface such as an HDMI (High-Definition Multimedia Interface), or a serial bus such as IEEE1394 or USB (Universal Serial Bus).

The television receiver 1 includes a broadcast receiver 11, a card slot 12, a memory card interface 13, an encoder 14, a multimedia data generator 15, a memory 16, an amplifier 17, a speaker 18, a display controller 19, display unit 110, a remote-controller light-receiving unit 111, a print controller 112, a communication controller 113, a display-information discriminator 114, a storage unit 115 and a remote controller 120.

The printer 2 includes a controller 21, a receive buffer 22, a rasterizer 23 and a print engine 24.

The structure of the television receiver 1 will now be described in detail.

<Broadcast Receiver 11>

Figure 2:
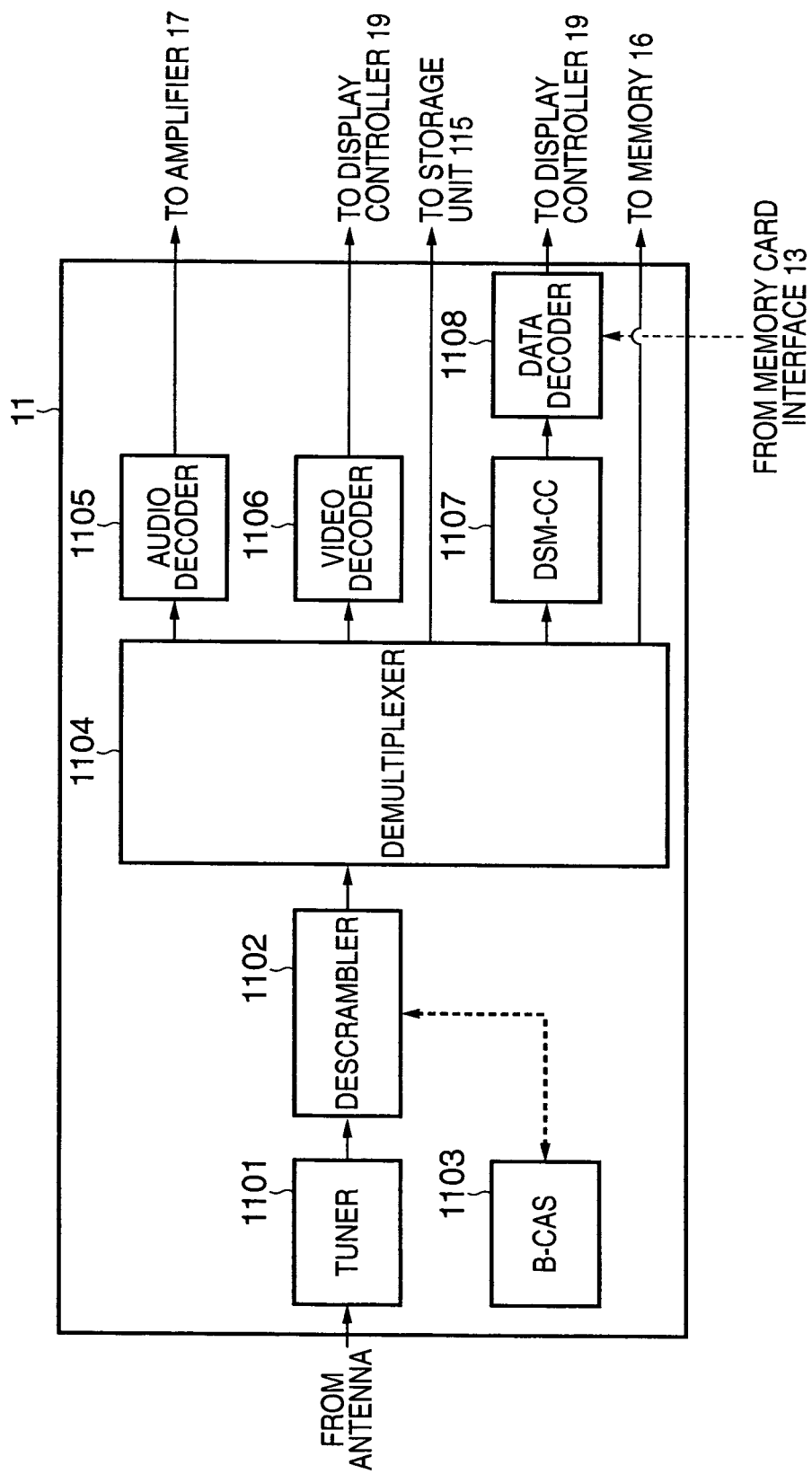
FIG. 2 is a block diagram illustrating an example of the structure of a broadcast receiver 11 in FIG. 1.

FIG. 2 is a block diagram illustrating an example of the structure of a broadcast receiver 11 in this embodiment.

The broadcast receiver 11 includes a tuner 1101, a descrambler 1102, a B-CAS 1103, a demultiplexer 1104, an audio decoder 1105, a video decoder 1106, a DSM-CC (Digital Storage Media Command and Control) 1107 and a data decoder 1108.

(Tuner 1101)

A television broadcast signal received through an antenna (not shown) is input to the tuner 1101. On the basis of information (frequency, TS_ID) corresponding to a channel to be received as designated by, e.g., the remote controller 120, the tuner 1101 changes over the frequency and outputs TS (Transport Stream) data corresponding to the designated channel.

(Descrambler 1102 and B-CAS 1103)

The descrambler 1102, together with the B-CAS 1103, implements utilization of a TV program that is based upon a license. More specifically, the descrambler 1102 applies descramble processing to the TS data using the MULTI12 cipher scheme (refer to Chapter 3 of ARIB STD-B25 for the details) and outputs the descrambled data.

(Demultiplexer)

The descrambled TS data is demultiplexed by the demultiplexer 1104 into the following:

a PES (Packetized Elementary Streams) packet such as an audio stream and video stream compliant with MPEG (Moving Picture Experts Group) 2; and a session of PSI (Program-Specific Information) data for transmitting program information or carousel data for data broadcast.

The audio stream is output to the audio decoder 1105, and the video stream is output to the video decoder 1106. Further, SI (Service Information) necessary in order to obtain program-related information is acquired from the PSI session and is stored in the storage unit 115, described later.

Further, data broadcasting data is output to the DSM-CC (Digital Storage Media Command and Control) 1107. The data broadcasting data is data transmitted from a broadcast station in order to implement a data broadcast. With a data broadcast, it is possible to present a display similar to that of Web content, such as a display of textual information or still pictures. Accordingly, the term "data broadcasting data" refers to overall data, such as various still pictures and textual information, utilized in a data broadcast.

Data for printing in digital broadcasts in Japan is multiplexed onto the data broadcasting data and is transmitted from the broadcast station. However, since parsing or rasterizing of the print data is not carried out in the television receiver 1, as described in Document 1, the print data is output to memory 16 (described later) as is.

(Audio Decoder 1105 and Video Decoder 1106)

The audio decoder 1105 decodes the audio stream by the method described in ARIB STD-B21, Chapter 6-62 "Voice Decoding Processing and Output" and outputs the decoded stream to the amplifier 17. The video decoder 1106 decodes the video stream by the method described in ARIB STD-B21 Chapter 6-61 "Video Decoding Processing and Output" and outputs the decoded stream to the display controller 19.

(DSM-CC 1107)

The DSM-CC 1107 subjects the data broadcasting data to carousel decoding processing described in Document 1 and outputs the processed data to the data decoder 1108.

(Data Decoder 1108)

The data decoder 1108 parses BML (Broadcast Markup Language) text data and CSS (Cascading Style Sheets) data from the decoded data broadcasting data and generates a DOM (Document Object Model) object. Further, the data decoder 1108 compiles ECMA (European Computer Manufacturer's Association) Script and executes decoding of monomedia data such as JPEG (Joint Photographic Experts Group) data. The DOM object and monomedia, etc., are output to the display controller 19 after being laid out in the display in accordance with BML.

Further, JPEG data, etc., that is input via the memory card interface 13 (described later) also is decoded in the data decoder 1108 and output to the display controller 19.

<Card Slot 12 and Memory Card Interface 13>

The card slot 12 and memory card interface 13 acquires data (e.g., JPEG data) that has been stored on a memory card inserted into the card slot 12. The data acquired from the memory card is converted by the multimedia data generator 15 (described later) to the XHTML format for printing and is decoded by the data decoder 1108.

<Encoder 14>

The encoder 14 encodes a capture image in a case where an image that is being played back is captured and printed (as a hard copy). For example, image data that has been encoded in the JPEG format is converted to the XHTML format for printing by the multimedia data generator 15 in a manner similar to the data acquired from the memory card.

<Multimedia Data Generator 15>

The multimedia data generator 15 converts data acquired from a memory card via the memory card interface 13 and capture image data encoded in the encoder 14 to print data in the XHTML-Print format. This conversion is performed by the method set forth in Document 2. The XHTML-Print format is a standard defined by the W3C (World-Wide Web Consortium). The details can be referred to as the following Internet site: (URL: http://www.w3.org/TR/xhtml-print/).

<Memory 16>

The memory 16 stores print data acquired from the broadcast waves and data that has been converted to print data in the multimedia data generator 15. The print data is locked in the memory 16 before the API for printing is executed, as set forth in Document 1. The print data is transferred to the printer 2 under the control of the communication controller 113 (described later) by executing an API to perform printing.

<Amplifier 17 and Speaker 18>

The amplifier 17 amplifies audio data that has been decoded by the audio decoder 1105 of the broadcast receiver 11 and outputs the amplified signal to the speaker 18.

<Display Controller 19 and Display Unit 110>

Figure 11:
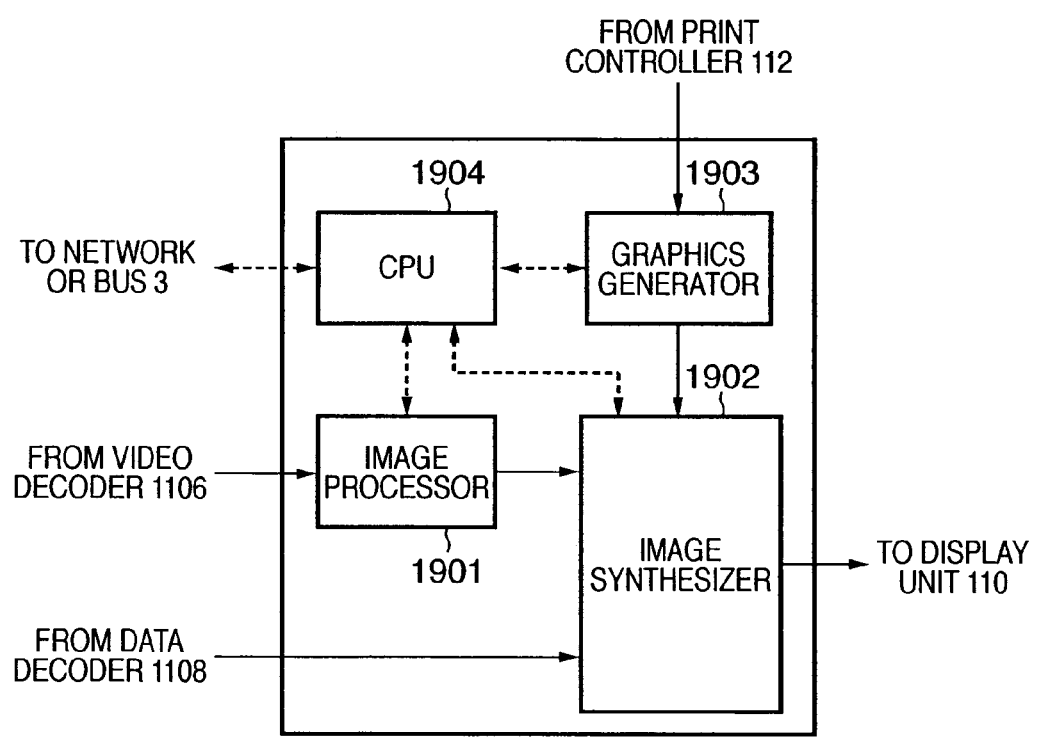
FIG. 11 is a block diagram illustrating an example of the structure of a display controller 19 in FIG. 1.

FIG. 11 is a block diagram illustrating an example of the structure of the display controller 19.

The display controller 19 exercises display control for when various embedded applications are executed and executes conversion processing for converting data to a format displayable on the display unit 110. Further, the display controller 19 communicates information (display information), which is related to the present display content of the display unit 110, to the display-information discriminator 114, described later.

Display control for when an embedded application is executed will be described first.

A case where the display controller 19 executes an embedded application for displaying JPEG data, which has been stored on a memory card inserted into the card slot 12, on the display unit 110 and printing the data will be described as one example. Using an image synthesizer 1902, a CPU 1904 superimposes image data acquired by the memory card interface 13 and decoded by the data decoder 1108 and GUI data generated by a graphics generator 1903 and displayed the synthesized image on the display unit 110. Printing will be described later.

A case where the display controller 19 executes an application for capturing video being played back and outputting (printing or displaying) the image will be described as a separate example. Using the image synthesizer 1902, the CPU 1904 superimposes video data that is input from the video decoder 1106 and GUI data generated by the graphics generator 1903. At this time the CPU 1904 executes timing control for halting frame update of the video data, thereby capturing the image. Printing will be described later.

Under the control of the CPU 1904, an image processor 1901 converts video data, which has been decoded by the video decoder 1106, to a resolution ideal for display on the display unit 110 and outputs the data to the image synthesizer 1902.

Furthermore, the CPU 1904 controls display changeover to execution of an embedded application, ordinary TV program viewing or data broadcast. The CPU 1904 transmits information relating to this display changeover to the display-information discriminator 114, described later.

<Remote-Controller Light-Receiving Unit 111>

The remote-controller light-receiving unit 111 receives an infrared signal that is output by the remote controller 120 in accordance with operation by the user and transmits information, which corresponds to a command from the remote controller 120, to the broadcast receiver 11. On the basis of the command from the remote controller 120, the remote-controller light-receiving unit 111 performs channel selection and changes various settings. The command from the remote controller 120 is transmitted to the print controller 112 as well and is reflected in the printing operation.

<Print Controller 112, Communication Controller 113 and Display-Information Discriminator 114>

As described in Document 1, the print controller 112 executes various print APIs [printFile( ) print(Uri( ) etc.] and controls transfer of print data to the printer 2 via the communication controller 113. The print controller 112 executes print error processing (described later) as well.

When the above-mentioned embedded applications are executed, it is required that this print control and the above-mentioned display control be executed simultaneously. The print controller 112 and display controller 19, therefore, communicate with each other.

Figure 12:
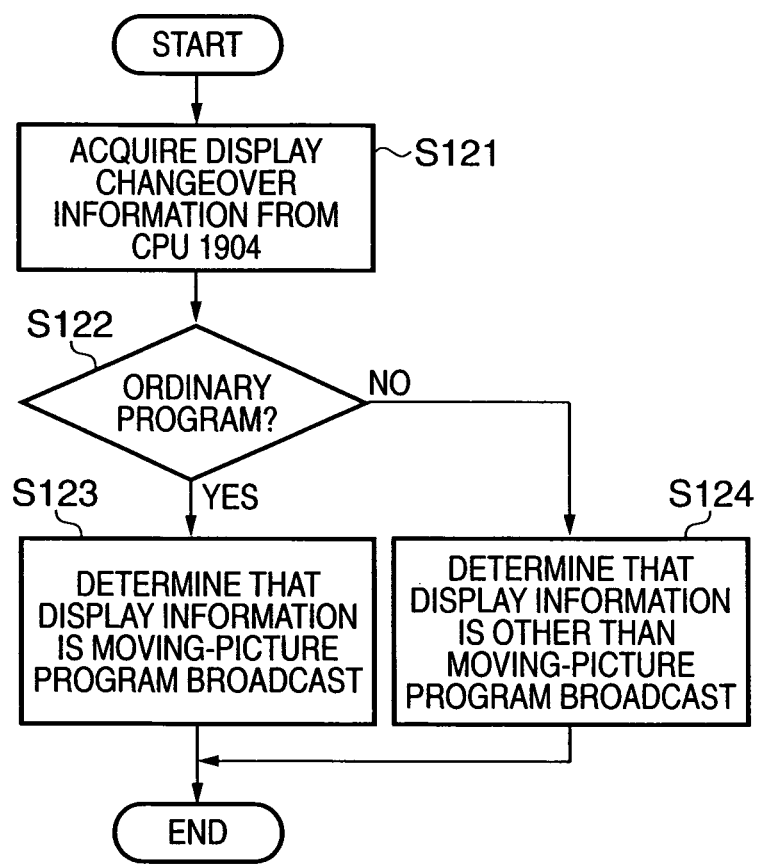
FIG. 12 is a flowchart useful in describing processing for discriminating display information in the first embodiment of the present invention.

The display-information discriminator 114 discriminates the type of display information being displayed on the display unit 110. This processing will be described with reference to the flowchart of FIG. 12.

The CPU 1904 of the display controller 19 changes over the display to ordinary TV program viewing, data broadcast or embedded application. The display-information discriminator 114 is capable of discriminating the type of display information based upon this display changeover information.

First, the display-information discriminator 114 acquires the display changeover information from the CPU 1904 (S121). If the display changeover information represents ordinary TV program viewing ("YES" at S122), then the display-information discriminator 114 determines that the type of display information is indicative of a moving-picture broadcast program (S123). If the display changeover information does not represent ordinary TV program viewing ("NO" at S122), then the display-information discriminator 114 determines that the type of display information is not indicative of a moving-picture broadcast program (S124).

That is, in a case where the CPU 1904 has affected a changeover to a data-broadcast display and to an embedded-application display, the display-information discriminator 114 determines that the type of display information is other than that of the moving-picture broadcast program.

Further, the display-information discriminator 114 may communicate with the CPU 1904 of the display controller 19, acquire display information that is output from the image synthesizer 1902 and discriminate the type from the display information. More specifically, if the display information is a moving picture, then the display-information discriminator 114 can utilize the fact that the content of this image changes with time. In this case, the display-information discriminator 114 acquires the display-information frame data (which may be only pixel data at a specific position) and can determine that a moving-picture broadcast program is in effect if a change with time is detected and that the type of display information is other than a moving-picture broadcast program if a change with time is not detected.

Control of print data will be described next. Print data that has been stored in the memory 16 upon being acquired from broadcast waves or generated in the multimedia data generator 15 is transferred from the memory 16 to the receive buffer 22 of the printer 2 by executing a print API. Response status sent back from the printer 2 is supplied to the print controller 112 via the communication controller 113. The response status includes an indication of occurrence of print error such as out of paper, etc. When response status indicating occurrence of print error has been sent back from the printer 2, print error processing, described later, is executed.

As mentioned above, there are also cases where only information [e.g., a URI (Uniform Resource Indicator) that refers to print data] for allowing the printer 2 to acquire print data is transferred without transferring print data from the television receiver 1 to the printer 2 at the time of printing.

In this case response status is also sent back from the printer 2 and supplied to the print controller 112 in a manner similar to the case where the television receiver 1 transfers print data. When response status in the event of print error is sent back from the printer 2, print error processing, described later, is executed.

Print data is transferred in accordance with a client-server model, in which the television receiver 1 is the client and the printer 2 is the server, as described in Document 1. One API is mapped to one logical request/response transaction. Further, parsing and rasterizing of a print file are performed by the printer 2 and not by the television receiver 1, as set forth above. Actual print processing is performed asynchronously with respect to execution of the API.

Further, after the print data has been transmitted completely to the printer, the user can designate station selection by operating the remote controller 120 even during printing.

<Storage Unit 115>

The storage unit 115, which is a storage device used to record SI and moving-picture broadcast data, may be a semiconductor storage device, a magnetic storage device (hard-disk drive, etc.) or optical recording device (optical disk, etc.). As will be described later, since recording of moving-picture broadcast data and time-shifted playback are carried out during execution of print error processing, the storage unit 115 preferably has enough capacity to store at least several minutes of moving-picture broadcast data.

<Printer 2>

Next, the printer 2 will be described. In accordance with print data or various control information transmitted from (or acquired from) the television receiver 1, the printer 2 executes print data for printing on a print medium typified by cut sheets of paper. As mentioned above, the printer 2 comprises the controller 21, receive buffer 22, rasterizer 23 and print engine 24.

The controller 21 controls the operation of each of the components in printer 2 and exercises control in such a manner that print data described in XHTML-Print, etc., is interpreted and the print data and reference file (image file, etc.) are output appropriately to the rasterizer 23.

The receive buffer 22 interprets an API command that has been executed in the print controller 112, accepts transfer of the substance of the print data or control data such as a URI for accepting the print data, and sends back acknowledgement.

The rasterizer 23 converts the print data and reference file, which have entered from the controller 21, to print bitmap data suited to the print engine 24.

The print engine 24, which has a mechanism for transporting the print medium and a print mechanism such as a printhead, executes printing on the print medium in accordance with the bitmap data supplied from the rasterizer 23. Although there is no particular limitation with regard to the printing type used by the print engine 24, the type may be an ink-jet type or dye-sublimation thermal transfer type.

<Print Error Processing>

Figure 3:
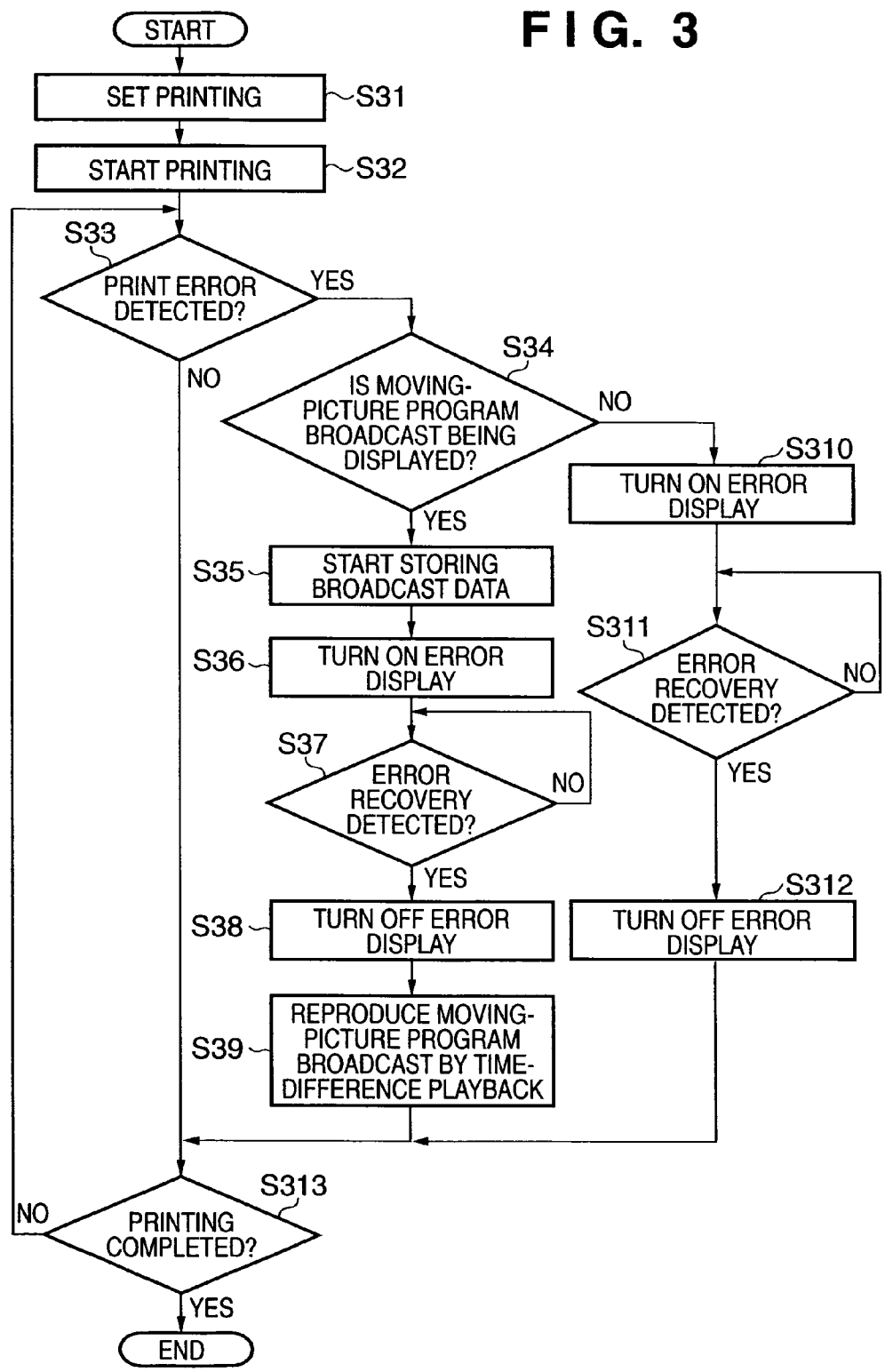
FIG. 3 is a flowchart useful in describing print error processing in the first embodiment of the present invention.

FIG. 3 is a flowchart useful in describing print error processing in the television receiver 1 according to this embodiment of the present invention. Print error processing is executed mainly by the print controller 112.

By way of example, the user operates the remote controller 120 to set printing (S31) and supplies the television receiver 1 with a command to start printing in accordance with the print setting (S32). When this is done, print data is generated by screen capture or by acquisition from broadcast waves, as mentioned above. The print controller 112 executes the print API so that print processing in the printer 2 begins.

In a case where a print error such as out of paper, no ink left or paper jamming occurs during execution of print processing by the printer 2, the printer 2 transmits an error response to the print controller 112, as mentioned above (S33).

The print controller 112 detects occurrence of print error by receiving the response status indicating print error from the printer 2. Upon receiving response status, the print controller 112 acquires the type of display information, which is being displayed on the display unit 110 at this time, from the display-information discriminator 114. If the display information is a moving-picture broadcast program ("YES" at S34), then the print controller 112 starts storing the data (audio data, video data, etc.) of the moving-picture broadcast program, which is output from the broadcast receiver 11, in the storage unit 115 in concurrence with display of the data (S35). For example, data of an error message that notifies the user of occurrence of the print error is generated using the graphics generator 1903 of the display controller 19 and the error-message data is output to the image synthesizer 1902. As a result, the error message is displayed by being superimposed on the moving-picture program to notify the user of occurrence of the error and prompt recovery (S36).

During display of the error message, video of the moving-picture serving as the background may be caused to pause as a still picture, or the background may be made a blue background and only the error message displayed.

Figure 4A:
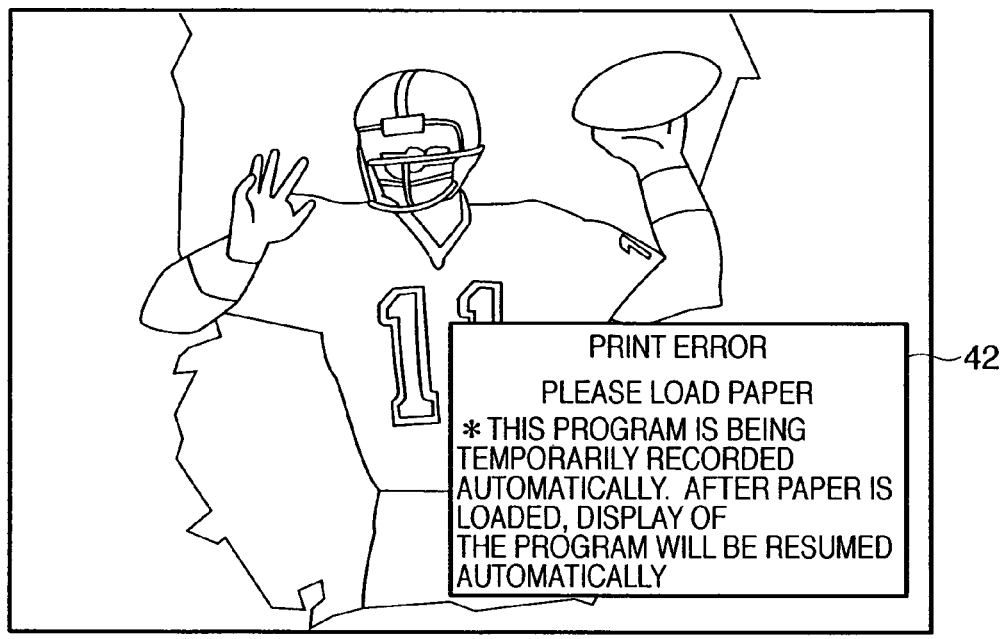
FIGS. 4A and 4B are diagrams illustrating examples of displays of error messages in an embodiment of the present invention.

FIG. 4A is a diagram illustrating an example of display of an error message. Preferably, a displayed error message 42 should include not only the substance of the error and/or the countermeasure but also an indication to the user that temporary recording is being performed automatically and that display of the program will be resumed automatically after error recovery.

The print controller 112 executes a command [getPrinterStatus( )] in the API, which is described in Document 1, to inquire about the status of the printer and determines by the response status from the printer 2 whether the error has been eliminated. In a case where the response status with respect to the command still indicates the error state, the print controller 112 executes the command again upon elapse of a predetermined length of time, by way of example.

If a change from an indication that the error status represents error to an indication representing no error is detected, then the print controller 112 determines that the error has been eliminated (i.e., that it has been dealt with by the user) ("YES" at S37). If the print controller 112 detects error recovery, it causes the graphics generator 1903 to halt generating the message data and turns off the display of the error message (S38). Next, the print controller 112 starts time-shifted playback of the moving-picture broadcast program using the information that has been stored temporarily in the storage unit 115 (S39). In other words, the print controller 112 starts playback of the moving-picture broadcast program from the moment storage begins and continues storage of information being received in real time.

On the other hand, if the type of display information being displayed on the display unit 10 is not a moving-picture broadcast program ("NO" at S34), then the print controller 112 assumes that the display information lacks or has little real-time property, as in the case of a still picture or data transmission. Then, at step S310, the print controller 112 displays and superimposes the error message on the display information, in a manner similar to that performed at S35, without storing data in the storage unit 115.

Figure 4B:
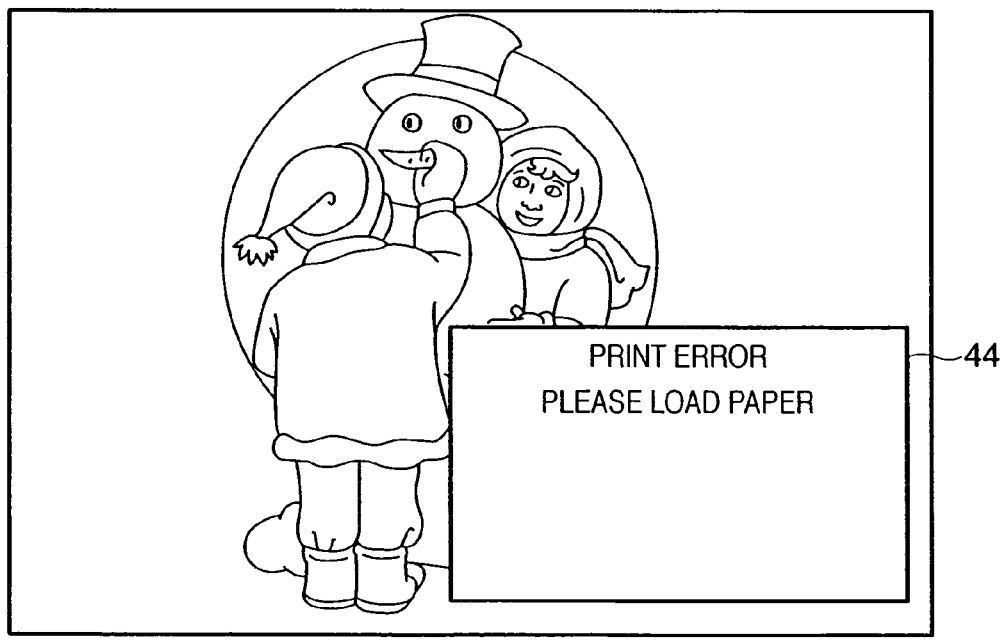
Figure 5:
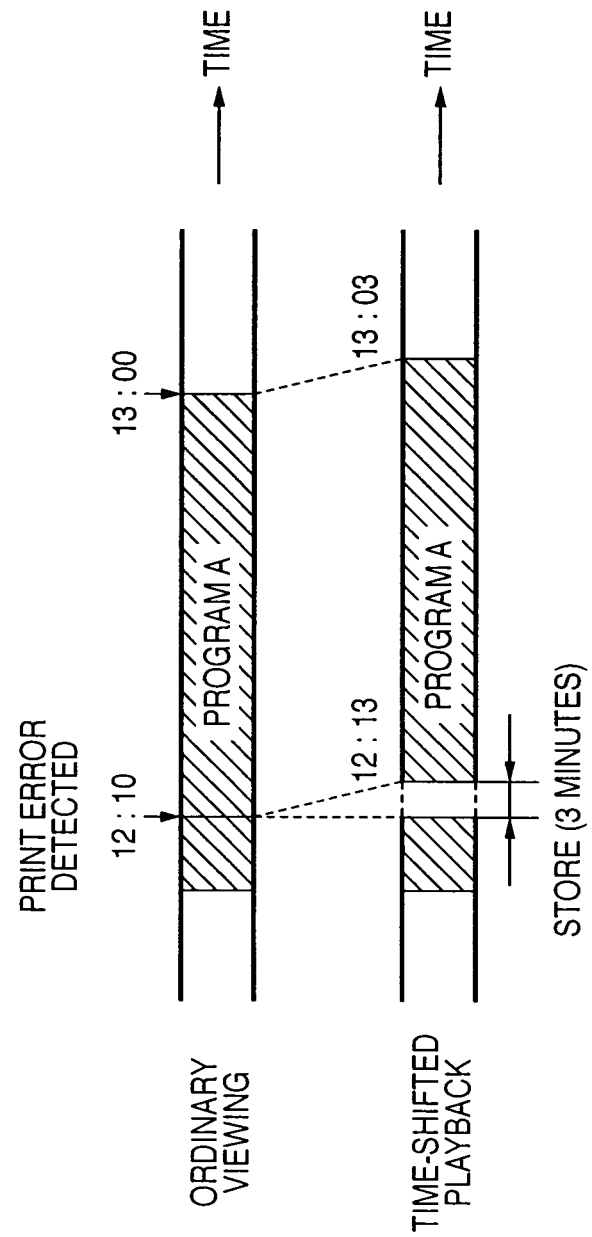
FIG. 5 is a diagram useful in describing time-shifted playback processing in an embodiment of the present invention.

An example of the error-message display presented at S310 is illustrated in FIG. 4B. Since automatic recording is not being carried out, the content of error message 44 is only the nature of the error that has occurred and the method of dealing with the error.

In a manner similar to that of S37, the print controller 112 repeatedly executes the command for inquiring about the status of the printer until the error is eliminated (S311). If error recovery is detected, the print controller 112 turns off the error display just as at S38 (S312).

The print controller 112 continues to perform detection of error occurrence in printer 2 and processing for when an error occurs until printing is completed (S313).

Time-shifted playback at S39 will now be described. For example, assume that during real-time viewing of moving-picture program broadcast A, a print error occurs (or more precisely, a response indicative of occurrence of the error is received from the printer 2) at exactly 12:10. Owing to display of the message described above, the user recognizes the occurrence of the error, deals with the error and eliminates the error (or more precisely, acquires a no-error response from the printer 2) at exactly 12:13.

In this case, the broadcast data stored in the storage unit 115 from 12:10 to 12:13 starts being played back from 12:13. The temporary storage of the broadcast data in the storage unit 115 continues even through the error is eliminated. However, since the broadcast data that has been read out of the storage unit is deleted, there is no reduction in the available capacity of the storage unit 115 after elimination of the error, and three minutes of the latest broadcast data will always exist in the storage unit 115. Thus, playback of the moving-picture program is performed after a delay of three minutes. Therefore, if viewing of the program continues as is, the program, which would originally have ended at 13:00, will end at 13:03. During time-shifted playback, program data that has been output from the broadcast receiver 11 is sent in its entirety to the display controller 19 after it is delayed for three minutes in the storage unit 115.

Figure 6:
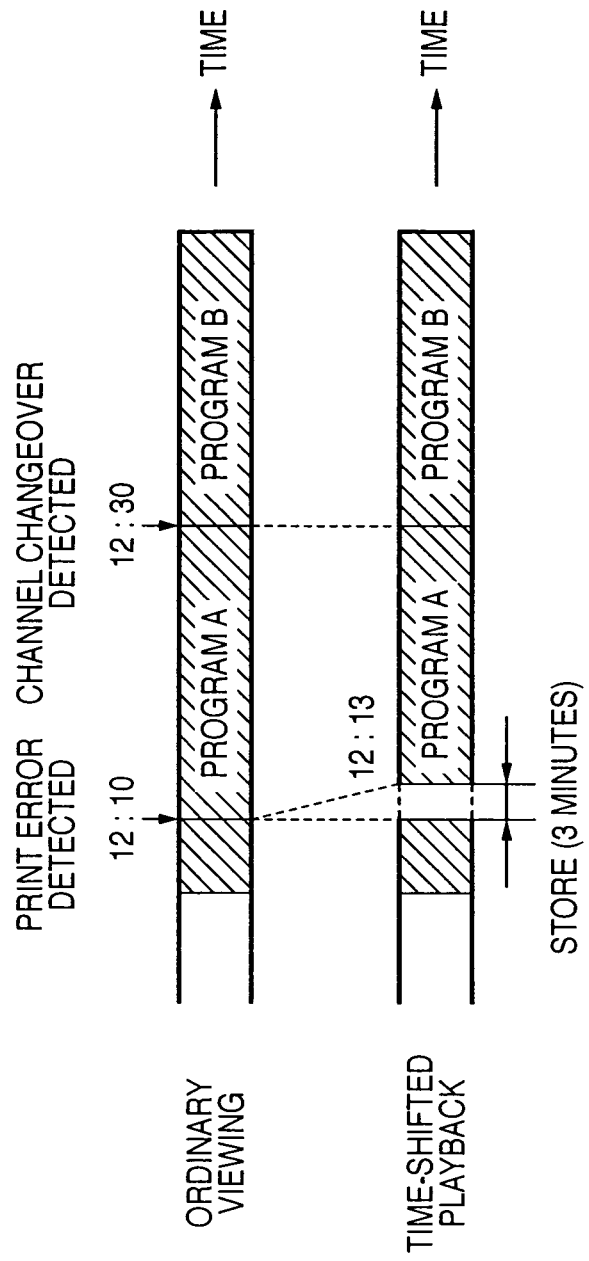
FIG. 6 is a diagram useful in describing time-shifted playback processing in an embodiment of the present invention.

In a case where an event that cuts off the temporal continuity of program viewing, such a switching of the channel or display of an electronic program menu, occurs during time-shifted playback (at 12:30), as illustrated in FIG. 6, storage of data in the storage unit 115 and time-shifted playback are suspended. Accordingly, owing to a channel switching command detected at 12:30 in FIG. 6, a changeover to real-time viewing of the channel to which the changeover has been made is performed following the changeover.

It should be noted that although the description has been rendered with regard to units of less than one minute for the sake of convenience, control in finer units of time is actually carried out.

Further, in order to conserve storage capacity of the storage unit 115, a limit may be imposed upon waiting time for detection of error recovery at S37. If the error is not eliminated within the time limit, time-shifted playback may be started immediately.

Thus, in accordance with the video playback apparatus of this embodiment, as described above, if an event of which notification is to be given occurs in a printing device connected to the apparatus so as to be capable of communicating, operation for storing display information is controlled in dependence upon the type of display information at the moment the event is detected. Accordingly, since display information of a type construed to require storage is stored, wasteful use of the storage capacity of the storage device owing to storage of unnecessary content can be reduced. Further, with regard to display information of a type that will be greatly affected as by hindrance of viewing by display of a message serving as information indicating an event of which notification is to be given, this display information is stored during the display of the message. As a result, it is possible to resume viewing in a message-free state following elimination of the error.

Second Embodiment

A second embodiment of the present invention will now be described.

The image playback apparatus according to the second embodiment of the invention is comparable to the television receiver 1 described in the first embodiment with the exception of display-information type discrimination processing in the display-information discriminator 114 and print error processing executed by the print controller 112. Accordingly, only processing specific to this embodiment will be described below.

(Discrimination of Type of Display Information)

Figure 13:
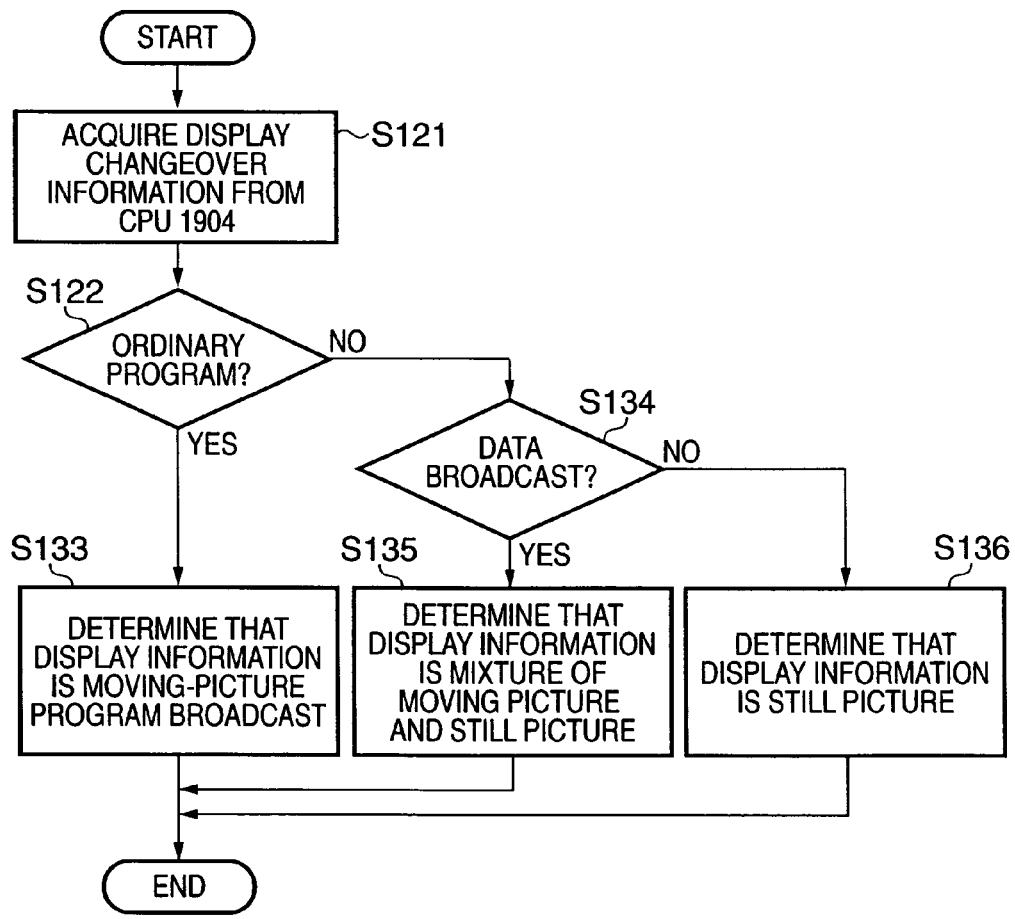
FIG. 13 is a flowchart useful in describing processing for discriminating display information in the second embodiment of the present invention.

FIG. 13 is a flowchart useful in describing processing for discriminating the type of display information being displayed on the display unit 110. This processing is executed by the display-information discriminator 114 according to this embodiment.

In this embodiment also, in a manner similar to the first embodiment, the display-information discriminator 114 acquires information relating to display changeover among ordinary program viewing, data broadcast and embedded application from the CPU 1904 of the display controller 19 (S121).

If the display changeover information represents ordinary TV program viewing ("YES" at S122), then the display-information discriminator 114 determines that the display information is a moving picture (S133). On the other hand, if the display changeover information represents viewing of a data broadcast ("YES" at S134), then the display-information discriminator 114 determines that the display information is information that is a mixture of moving and still pictures (S135). It should be noted that the data broadcast assumed here is a program-linked data broadcast. In other words, this signifies a data broadcast in which the display screen presents a mixture of a broadcast program area and a data display area. Furthermore, if the display changeover information represents an embedded application, then the display-information discriminator 114 determines that the display information is a still picture (S136).

Further, as in the first embodiment, type may be discriminated from display information that is output from the image synthesizer 1902. In this embodiment, however, the determination made is not moving picture or display information other than moving picture. Rather, the determination made is whether a moving picture is displayed over the entire display area, whether a moving picture is displayed in part of the display area or whether the entirety of the display is a still picture. Accordingly, the display-information discriminator 114 detects whether or not there is a temporal change at a plurality of locations of frame data.

(Print Error Processing)

Figure 7:
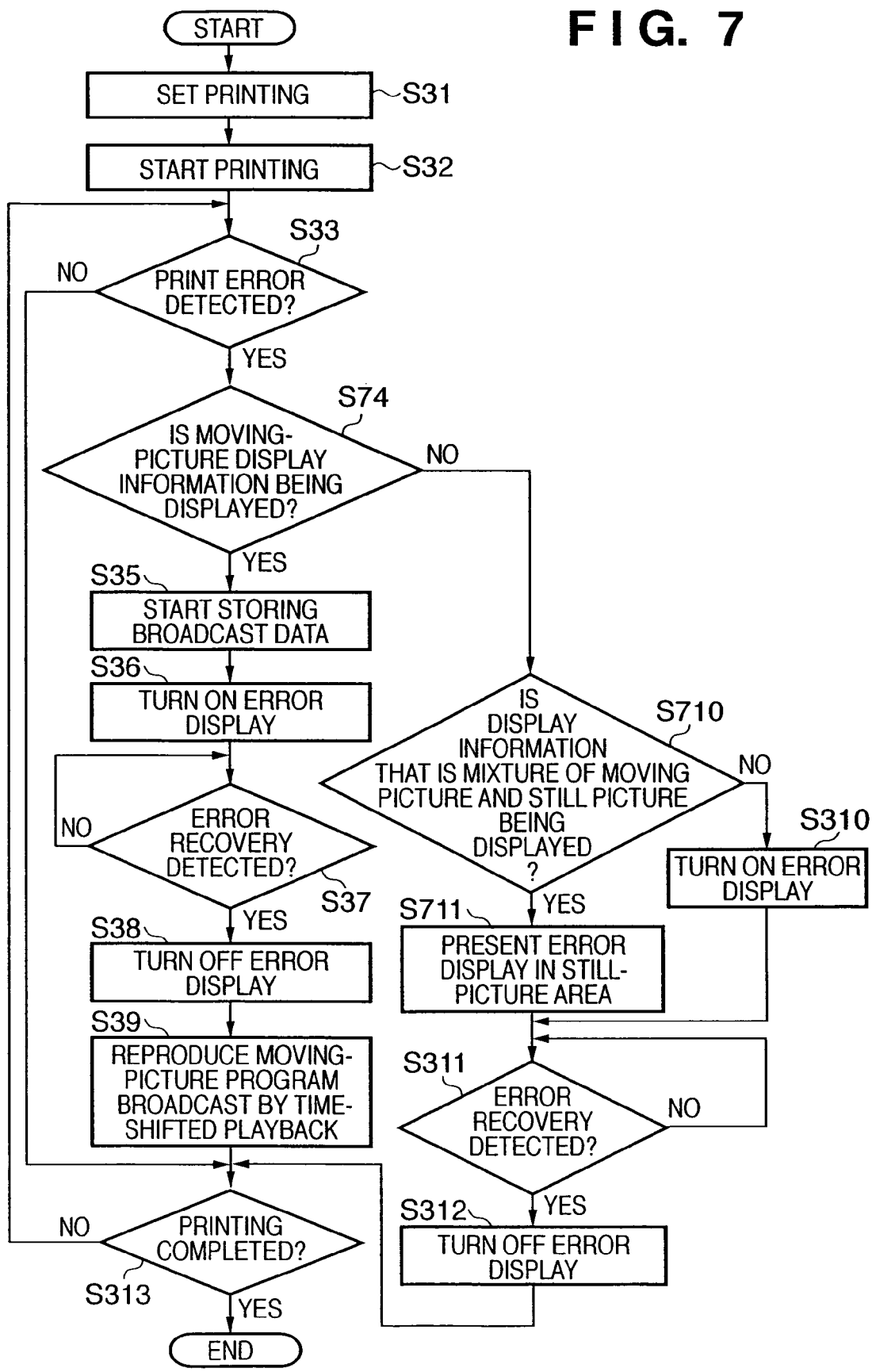
FIG. 7 is a flowchart useful in describing print error processing in the second embodiment of the present invention.

FIG. 7 is a flowchart useful in describing print error processing executed by the print controller 112 in this embodiment. Processing steps in FIG. 7 similar to those shown in FIG. 3 are designated by like step numbers and need not be described again.

In a case where a response representing error has been received at S33, the print controller 112 acquires the type of display information, which is being displayed on the display unit 110 at this time, from the display-information discriminator 114. If the display information is moving-picture display information ("YES" at S74), then the print controller 112 starts storing the display information (video and audio data), which is output from the broadcast receiver 11, in the storage unit 115 in concurrence with display of the information (S35). The print controller 112 displays the error message by superimposing it on the moving-picture display information, as illustrated in FIG. 4A (S36).

The print controller 112 repeatedly sends the printer 2 the command inquiring about status until elimination of the error in printer 2 is eliminated (S37). If error recovery in printer 2 is detected, then the print controller 112 turns off the error display (S38) and reproduces the moving picture, which has been stored temporarily in the storage unit 115, by time-shifted playback described in the first embodiment (S39).

Thus, in a case where the display information is a moving picture, the print controller 112 of this embodiment executes processing identical with processing applied to the moving-picture broadcast program of the first embodiment.

On the other hand, in a case where the display information being displayed on the display unit 110 is information that is a mixture of moving and still pictures as in a data broadcast ("YES" at S710), the print controller 112 causes display of a brief error message 82, as illustrated in the example of display shown in FIG. 8 (S711). In this case, the print controller 112 extracts information, which concerns the area (moving-picture display area) displaying a moving picture 81 on a data broadcast screen, from the data decoder 1108 of the broadcast receiver 11 and displays the error message while avoiding the moving-picture display area. The position at which the message is displayed can be controlled by indicating it to the image synthesizer 1902 together with the message data from the graphics generator 1903, by way of example.

Thus, in case of display information that is a mixture of moving and still pictures, the error message is displayed in a form superimposed on the still-picture portion. As a result, there is no change in the image that is the background of the error message and it is no longer necessary to store a moving picture temporarily, just as in a case where the display information is a still picture. Further, since the content of the message is simplified to reduce the display area necessary, it is possible to present a display of the error message that avoids the moving-picture display area even if the moving-picture display area is comparatively large. In particular, in case of a data broadcast, textual information is usually contained in an area other than the moving-picture area. If a detailed error message is displayed superimposed on the textual information, a problem which arises is that it will be difficult to read. In this respect also, therefore, the content of the message preferably is kept short and simple.

With regard to detecting error recovery in the printer 2 (S311) and processing for turning off the error display (S312), the processing is similar to that of the first embodiment and is not described again here.

In a case where "NO" decisions are rendered at both S74 and S710, or in other words, in a case where the type of display information being displayed on the display unit 110 at detection of occurrence of print error is a still picture, the print controller 112 executes the processing of S310 to S312 of the first embodiment. In other words, at S310, the print controller 112 presents display of an error message that does not have an explanation to the effect that temporary recording is being performed, as shown in FIG. 4B, and then detects error recovery in printer 22 and executes processing for turning off the error message display.

The print controller 112 repeatedly executes the above-described processing until print processing is completed (S715).

Thus, in accordance with this embodiment, as described above, in addition to control of the storage operation according to the first embodiment, an error message is displayed by being superimposed on a still-picture area in a case where display information being displayed when a message display is presented is a mixture of moving and still pictures. This makes possible control of a storage operation that is finer than that of the first embodiment, and unnecessary use of storage capacity of the storage unit 115 can be suppressed to a greater degree.

Third Embodiment

A third embodiment of the present invention will be described next.

The functional configuration of the video playback apparatus according to this embodiment also may be that shown in FIG. 1.

It is permissible to adopt an arrangement provided with an external storage device 4 (FIG. 1) connected to the communication medium such as a network or bus denoted by reference numeral 3 connecting the television receiver 1 and printer 2. In this case, control of the external storage device 4 from the television receiver 1 can be performed using CEC (Consumer Electronics Control) if the communication medium 3 is an HDMI.

The video playback apparatus according to the third embodiment is comparable to the television receiver 1 described in the first embodiment with the exception of display-information type discrimination processing in the display-information discriminator 114 and print error processing executed by the print controller 112. Accordingly, only processing specific to this embodiment will be described below.

(Discrimination of Type of Display Information)

Figure 14:
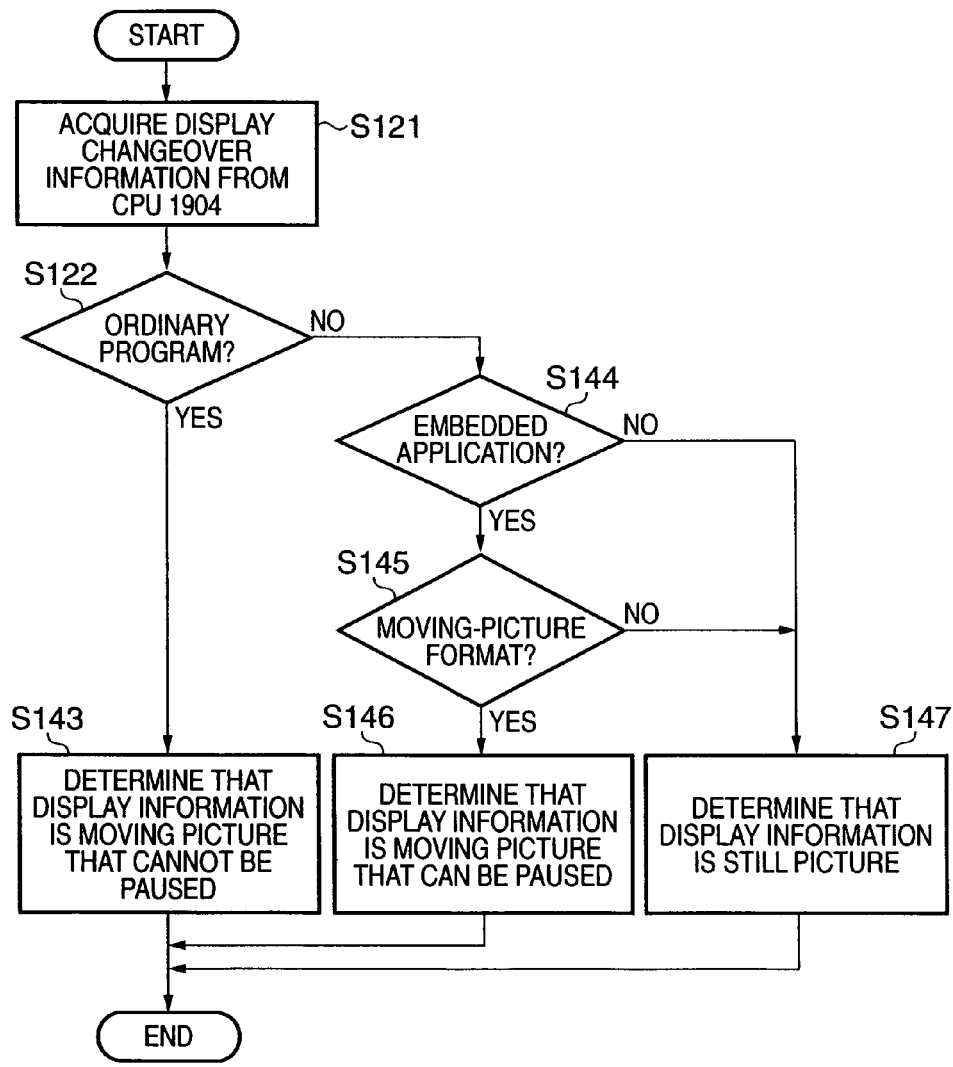
FIG. 14 is a flowchart useful in describing processing for discriminating display information in the third embodiment of the present invention.

FIG. 14 is a flowchart useful in describing processing for discriminating the type of display information being displayed on the display unit 110. This processing is executed by the display-information discriminator 114 according to this embodiment.

In this embodiment also, in a manner similar to the first embodiment, the display-information discriminator 114 acquires information relating to display changeover among ordinary program viewing, data broadcast and embedded application from the CPU 1904 of the display controller 19 (S121).

If the display changeover information represents ordinary TV program viewing ("YES" at S122), then the display-information discriminator 114 determines that the display information is a moving picture that cannot be paused (S143). On the other hand, if the display changeover information represents an embedded application ("YES" at S144), the display-information discriminator 114 checks the data format decoded in the data decoder 1108. If the format is the data format of a moving picture ("YES" at S145), then the display-information discriminator 114 determines that the display information is a moving picture that can be paused (i.e., a controllable moving picture) (S146).

If the format is the data format of a still picture ("NO" at S145), the display-information discriminator 114 determines that the display information is a still picture (S147). It should be noted that a moving picture that cannot be paused is a moving-picture broadcast program obtained by receiving broadcast waves. Further, a moving picture that can be paused (a controllable moving picture) is a moving picture the pause operation of which can be controlled from the television receiver 1. More specifically, this is a moving picture that has been stored on a memory card, the moving picture being read out by controlling the memory card interface 13, by way of example. Further, the moving picture may be a moving picture that has been stored in the external storage device 4.

(Print Error Processing)

Figure 9:
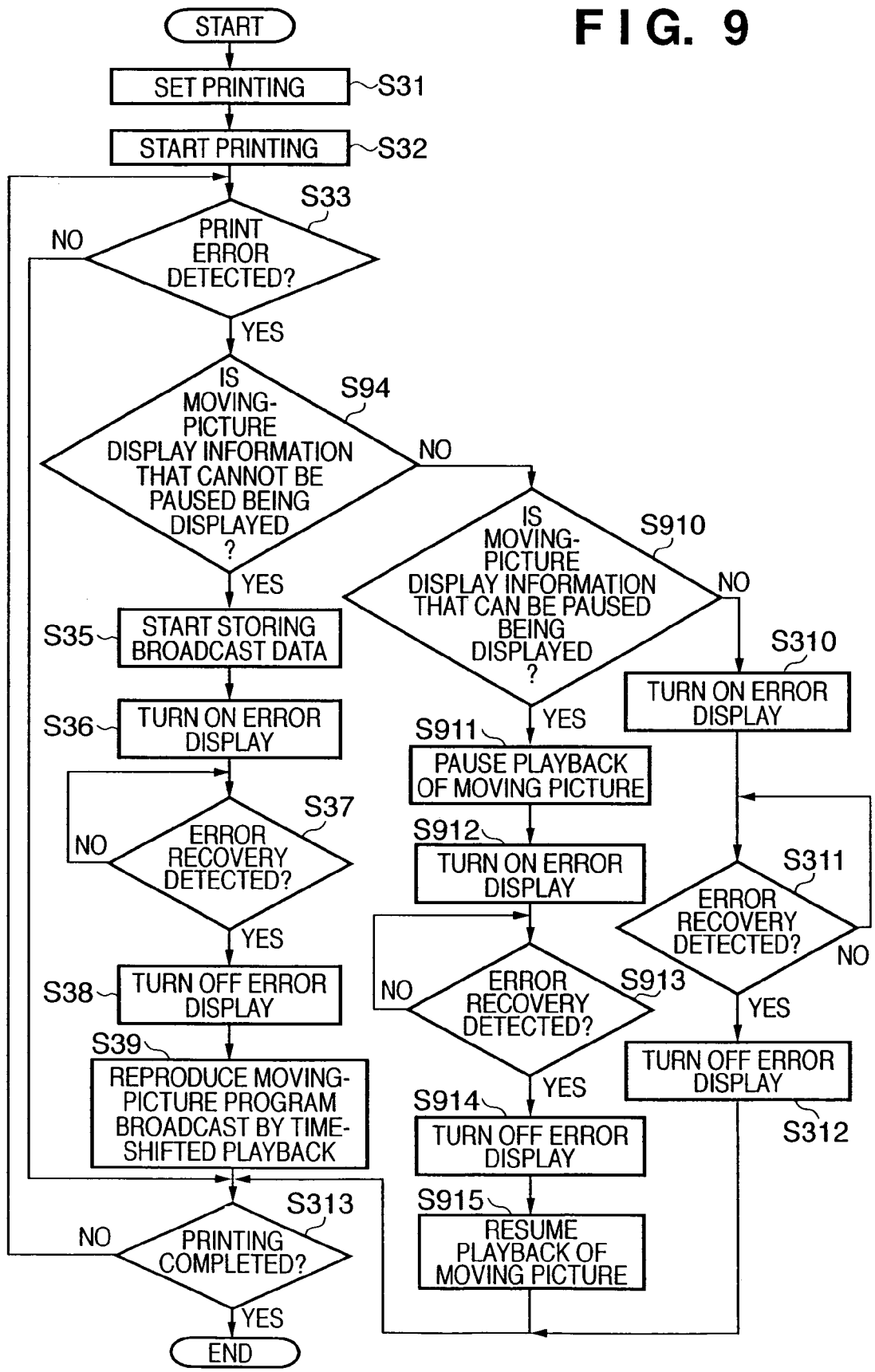
FIG. 9 is a flowchart useful in describing print error processing in the third embodiment of the present invention.

FIG. 9 is a flowchart useful in describing print error processing executed by the print controller 112 in this embodiment. Processing steps in FIG. 9 similar to those shown in FIG. 3 are designated by like step numbers and need not be described again.

Figure 10A:
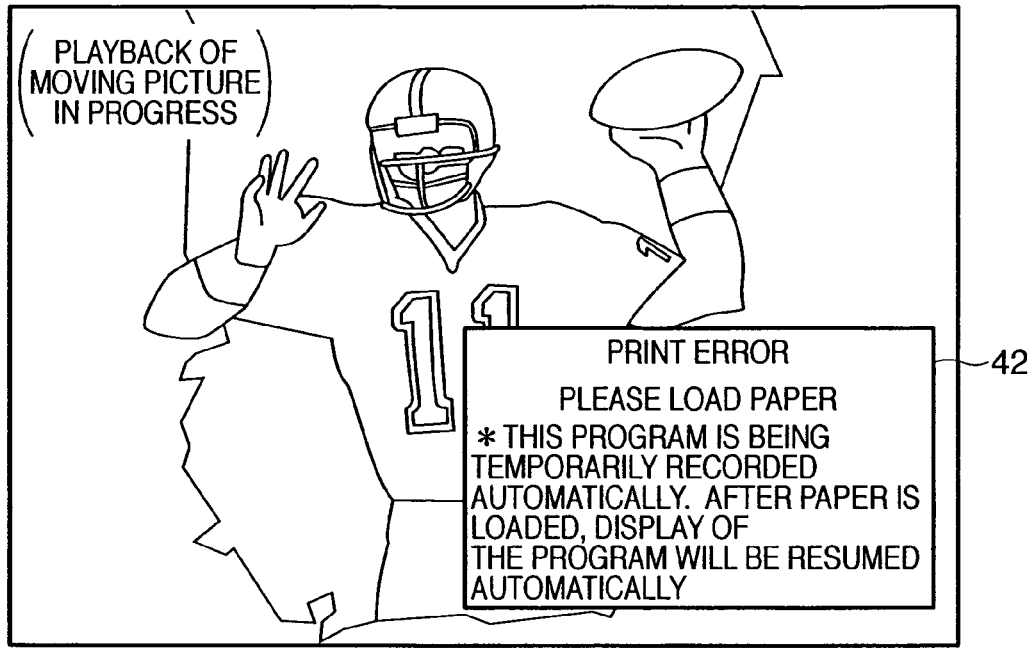
FIGS. 10A and 10B are diagrams illustrating examples of displays of error messages in the third embodiment of the present invention.

In a case where a response representing error has been received at S33, the print controller 112 acquires the type of display information, which is being displayed on the display unit 110 at this time, from the display-information discriminator 114. If the display information is display information indicative of a moving picture that cannot be paused ("YES" at S94), then the print controller 112 starts storing the display information (video and audio data), which is output from the broadcast receiver 11, in the storage unit 115 in concurrence with display of the information (S35). As mentioned above, a moving picture that cannot be paused refers to a moving picture, such as a moving-picture broadcast program, for which the pause operation cannot be controlled from the television receiver 1. The print controller 112 displays the error message by superimposing it on the moving-picture display information, as illustrated in FIG. 10A (S36). In this embodiment also it is preferred that a message to the effect that temporary storage is being performed be included in the error message in a manner similar to that of the first embodiment. Processing is then executed in a manner similar to the processing of S37 to S39 in the first embodiment.

On the other hand, in a case where the display information being displayed on the display unit 110 is display information indicative of a moving picture that can be paused ("NO" at S94 and "YES" at S910), the print controller 112 controls the output source of the display information and pauses the output of the moving picture (S911). A moving picture that can be paused refers to a moving picture for which the pause operation can be controlled from the television receiver 1. For example, this may be a moving picture that has been recorded on a memory card inserted into the card slot 12 and read out by controlling the memory card interface 13. Alternatively, it may be a moving picture that has been recorded on the external storage device 4 or in a digital camera, etc., connected to the communication medium 3, which is a network or high-speed serial bus.

Figure 10B:
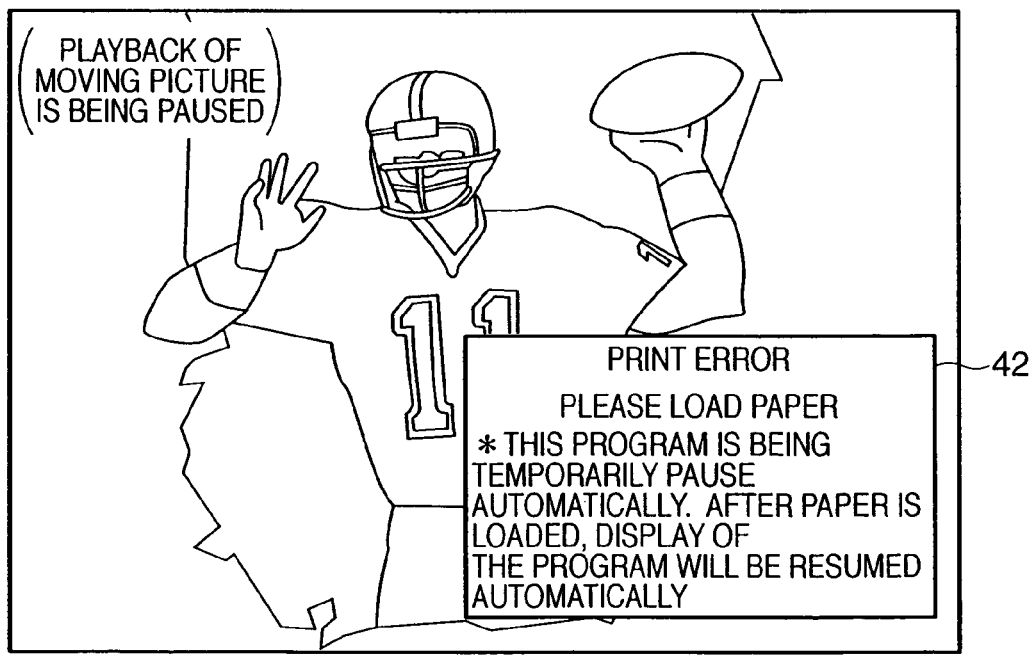

The print controller 112 can pause the moving-picture output by controlling the memory card interface 13 or transmitting an AVC command to a connected digital camera. The print controller 112 displays the error message by superimposing it on the paused moving-picture display information, as illustrated in FIG. 10B (S912).

It is preferred that the error message presented at this time also include a message to the effect that display of the moving picture has been paused automatically and will be resumed automatically when the operating state is restored from the normal state from the error state.

Thereafter, in a manner similar to S37, the print controller 112 acquires the status of the printer 2 until elimination of the error is detected (S913). If elimination of the error has been detected, the print controller 112 turns off the error display (S914) and resumes playback of the moving picture (S915).

On the other hand, if the type of display information being displayed on the display unit 110 at detection of print error is not a moving picture, then the print controller 112 executes processing similar to S310 to S312 in the first embodiment. That is, the print controller 112 causes the error message shown in FIG. 4B to be displayed and, if the error has been eliminated, turns off display of the error message.

The print controller 112 repeatedly executes the above-described processing until print processing is completed (S313).

Thus, in accordance with this embodiment, as described above, in a case where display information at detection of occurrence of error in a printing device is indicative of a moving picture that cannot be paused, the display information is stored temporarily. Accordingly, besides the effects of the first embodiment, an additional effect is that it is possible to further reduce processing for unnecessary temporary recording.

Fourth Embodiment

A fourth embodiment of the present invention will be described next.

Figure 15:
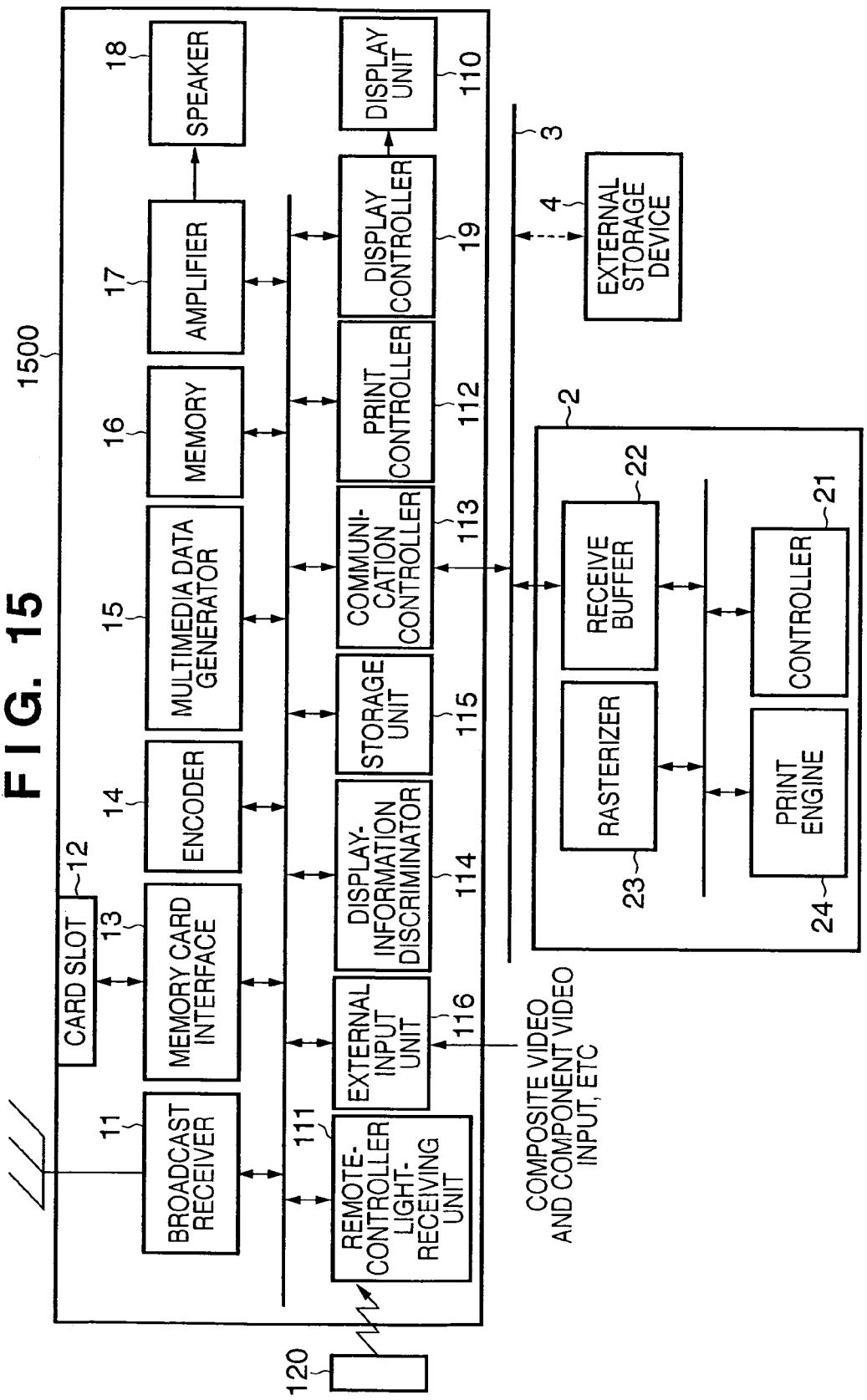
FIG. 15 is a block diagram illustrating an example of the configuration of a video playback system in which a television receiver 1500, which is an example of a video playback apparatus according to a fourth embodiment of the present invention, and a printing device 2 are connected so to be capable of communicating with each other.

FIG. 15 is a block diagram illustrating an example of the structure of a video playback apparatus according to this embodiment. As will be understood from a comparison between FIGS. 1 and 15, a television receiver 1500 serving as the video playback apparatus according to this embodiment has a structure obtained by adding on an external input unit 116 to the arrangement of FIG. 1. Portions common to both arrangements need not be described again.

The external input unit 116 in this embodiment is equipped with a connector and A/D converter for externally inputting a video signal such as composite video and component video, and an audio signal. A video that has been input to the external input unit 116 is subjected to an A/D conversion in the external input unit 116. The display controller 19 converts the resultant digital signal to data ideal for display on the display unit 110 and then outputs the data by displaying it. Further, an audio signal that has been input to the external input unit 116 is amplified by the amplifier 17 and then output from the speaker 18.

In this embodiment, the functional configuration of the display controller 19 is that shown in FIG. 11 as in the first embodiment. In this embodiment, however, the external input unit 116 is additionally provided. The CPU 1904 therefore controls display changeover among four inputs that include the external input signal in addition to an embedded application, ordinary program viewing and data broadcast. The changeover information is communicated to the display-information discriminator 114.

Further, in this embodiment, the external storage device 4 may be connected to the communication medium 3 connecting the television receiver 1500 and printer 2 so that they can communicate. For example, the communication medium 3 may be a network such as a LAN, a multimedia interface such as an HDMI, or a high-speed serial bus such as IEEE1394 or USB. In this case, control of the external storage device 4 from the television receiver 1500 can implement playback, stop and pause, etc., using CED if the communication medium 3 is an HDMI. However, operation of a device (e.g., a video deck or the like) to which a video signal is input from the external input unit 116 cannot be controlled from the television receiver 1500. The reason for this is that only video and audio signals are input to the external input unit 116; an exchange of control signals is not possible.

(Discrimination of Type of Display Information)

Figure 16:
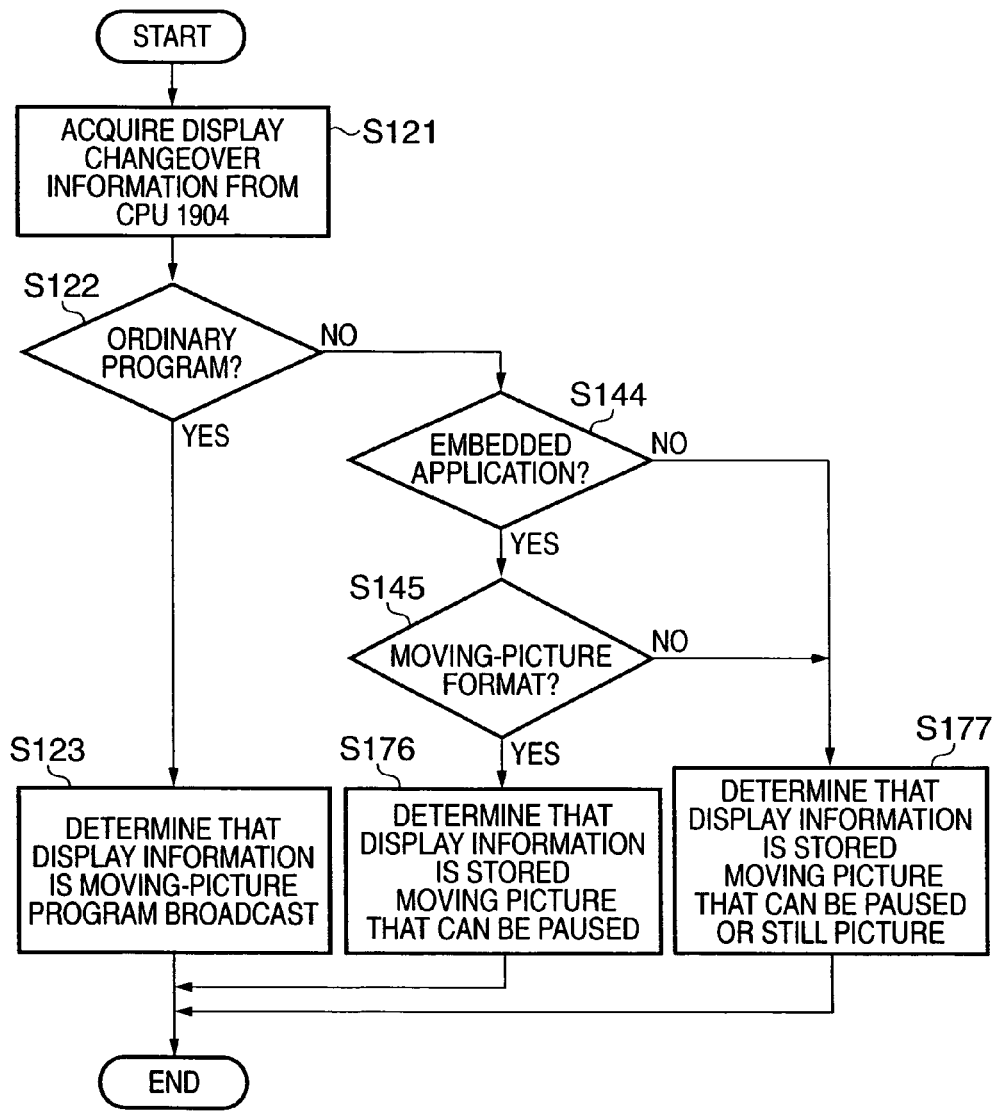
FIG. 16 is a flowchart useful in describing processing for discriminating display information in the fourth embodiment of the present invention.

FIG. 16 is a flowchart useful in describing processing for discriminating the type of display information being displayed on the display unit 110. This processing is executed by the display-information discriminator 114 according to this embodiment.

In this embodiment also, in a manner similar to the first embodiment, the display-information discriminator 114 acquires display changeover information from the CPU 1904 of the display controller 19 (S121).

If the display changeover information represents ordinary TV program viewing ("YES" at S122), then the display-information discriminator 114 determines that the type of display information is a moving-picture program broadcast (S123).

If the display changeover information represents an embedded program ("YES" at S144), then the display-information discriminator 114 checks the data format decoded in the data decoder 1108. If the format is the data format of a moving picture ("YES" at S145), then the display-information discriminator 114 determines that the display information is a stored picture that can be paused (S176). In this embodiment, a "stored moving picture" is assumed to signify a moving picture that has already been recorded on any recording medium and can be output again.

In a case where the display changeover information represents a data broadcast or external input signal, or in a case where a still-picture data format has been detected at S145, the display-information discriminator 114 determines that the display information is either a stored moving picture that can be paused or a still picture (S177).

(Print Error Processing)

Print error processing in the television receiver 1500 according to this embodiment will be described next.

In this embodiment, print error processing executed by the print controller 112 is substantially the same as that of the third embodiment described above with reference to the flowchart of FIG. 9.

At S94, the print controller 112 determines whether the result of discrimination by the display-information discriminator 114 is a moving-picture program broadcast, not whether it is a moving picture that cannot be paused. The print controller 112 executes the processing of S35 to S39 in case of a moving-picture program broadcast, and executes the processing of S911 to S915 in case of a moving picture that can be paused. Further, the print controller 112 executes the processing of S310 to S312 in a case where the result of discrimination by the display-information discriminator 114 is a still picture, data broadcast or stored moving picture that cannot be paused. In case of a stored moving picture that cannot be paused, however, the background of the error message becomes the display of the moving picture.

According to this embodiment, in the case of a stored moving picture that cannot be paused, such as a video signal that enters from the external input unit 116, it is possible, if the user desires, to readily change the portion at which viewing is impeded by display of an error message. This means that an operation for storing the moving picture is not carried out.

In this embodiment, as described above, it is so arranged that a stored moving picture, such as a moving picture that is input to an external input unit, does not undergo a storage operation even if it is a moving picture that cannot be paused. Accordingly, besides the effects of the third embodiment, an additional effect is that it is possible to further reduce processing for unnecessary temporary recording.

Other Embodiments

Only a video playback apparatus having a display device is described in the foregoing embodiments. However, the display device may be connected externally of the apparatus. In other words, it will suffice if the video playback apparatus is capable of outputting video (video for display) that can be displayed by a display device; the apparatus need not possess the display device. It goes without saying that the video for display mentioned here includes voice as well.

Accordingly, the present invention is applicable to any device that can output video for display and can be connected to a printing device, such as a TV tuner or a personal computer having a video input terminal.

The foregoing embodiments are capable of being implemented in the form of software by the computer (or CPU or MPU, etc.) of a system of apparatus.

Accordingly, since the foregoing embodiments are implemented by computer, the computer program per se supplied to the computer also implements the present invention. In other words, a computer program per se for implementing the functions of the foregoing embodiments is one aspect of the present invention.

If the computer program for implementing the foregoing embodiments is readable by computer, it may be in any form. For example, although it can be constituted by object code, a program executed by an interpreter or script data supplied to an operating system, etc., it is not limited to these.

The computer program for implementing the foregoing embodiments is supplied to the computer by a storage medium or wired/wireless communication. Examples of storage media for supplying the program are magnetic recording media such as flexible disk, hard disk and magnetic tape, optical/magneto-optical storage media such as a magneto-optical disk, CD and DVD, and a non-volatile semiconductor memory.

As for the method of supplying the computer program using wired/wireless communication, there is a method that utilizes a server on a computer network. In this case, a data file (program file) that can serve as a computer program for forming the present invention is stored in the server beforehand. The program file may be one in an execution format or it may be source code.

The program file is supplied by downloading it to a client computer that has accessed this server. In such case the program file can be divided into a plurality of segment files and the segment files can be dispersed and deployed at different servers.

In other words, a server apparatus that supplies a client computer with a program file for implementing the foregoing embodiments also is one aspect of the present invention.

Further, a storage medium on which the computer program for implementing the foregoing embodiments has been encrypted and stored may be distributed, users who meet certain requirements may be supplied with decryption key information, and these users may be permitted to install the program on their computers. The key information can be supplied by being downloaded from a website via the Internet, by way of example.

Further, the computer program for implementing the foregoing embodiments may utilize the functions of an operating system already running on the computer.

Furthermore, the computer program for implementing the foregoing embodiments may be constituted by firmware such as an expansion board installed in the computer, or it may be so arranged that the program is executed by a CPU provided on an expansion board.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-289199, filed on Oct. 24, 2006, which is hereby incorporated by reference herein in its entirety.

The invention claimed is:

1. A broadcast receiving apparatus, which is communicatably connected to a printing device and which is capable (a) of outputting a video image to a display unit and (b) of storing a video image in a storage unit connected thereto, said apparatus comprising a processor programmed to function as a device that comprises:
   a receiving unit that receives a broadcast program via a broadcast signal;
   a state detecting unit that detects an error state of a connected printing device;
   a discriminating unit that discriminates, when said state detecting unit detects that an error has occurred in the printing device, whether a type of video image being output to the display unit is a moving-picture broadcast program received by the receiving unit;
   a superimposing unit that superimposes error information, which indicates that an error has occurred in the printing device, on the video image to be output to the display unit when said state detecting unit detects that an error has occurred in the printing device; and
   a control unit that, if the type of video image being output to the display unit when said state detecting unit detects that an error has occurred in the printing device is discriminated by said discriminating unit as the moving-picture broadcast program, starts to store, in the storage unit, the video image of the moving-picture broadcast program on which the error information is not superimposed by said superimposing unit,
   wherein if the type of video image being output to the display unit when said state detecting unit detects that an error has occurred in the printing device is discriminated by said discriminating unit as a mixture of moving picture and still picture, said control unit (a) does not start to store, in the storage unit, the video image and (b) controls said superimposing unit to superimpose the error information on a region of the video image in which the still picture is displayed and not on a region of the video image in which the moving picture is displayed, wherein the still picture and the moving picture are displayed together on a screen in separate regions.

2. The apparatus according to claim 1, wherein if the type of video image being output to the display unit is discriminated by said discriminating unit as a predetermined type different from the moving-picture broadcast program, said control unit does not start to store, in the storage unit, the video image.

3. The apparatus according to claim 2, wherein the predetermined type of video image includes at least one of (a) a still picture, (b) a data broadcast, and (c) a moving picture that can be paused.

4. The apparatus according to claim 3, wherein in a case where the type of video image being output to the display unit is discriminated by said discriminating unit as the data broadcast, said control unit controls said superimposing unit in such a manner that the error information is superimposed on a region of the video image in which a still picture is displayed.

5. The apparatus according to claim 1, wherein said control unit halts the superimposing of the error information by said superimposing unit if said state detecting unit detects an error recovery of the printing device.

6. The apparatus according to claim 5, wherein if there is a video image of the moving-picture broadcast program that has been stored in the storage unit in response to the detection of the occurrence of the error in the printing device, said control unit starts an output, to the display unit, of the video image of the moving-picture broadcast program that has been stored in the storage unit, if said state detecting unit detects the error recovery of the printing device.

7. The apparatus according to claim 5, wherein when said state detecting unit detects that an error has occurred in the printing device and said discriminating unit discriminates the type of video image being output to the display unit as the moving picture that can be paused, said control unit temporarily pauses the output of the video image by controlling a source device of the video image, and
   wherein if said state detecting unit detects the error recovery of the printing device, said control unit resumes the output of the video image from the source device that has been temporarily paused by controlling the source device.

8. The apparatus according to claim 1, wherein the still picture is displayed on a left side of the screen and the moving picture is displayed on the right side of the screen.

9. A method of controlling a broadcast receiving apparatus, which apparatus comprises a receiving unit that receives a broadcast program via a broadcast signal and is (a) communicatably connected to a printing device and (b) capable (1) of outputting a video image to a display unit and (2) of storing a video image in a storage unit connected thereto, said method comprising:
- a state detecting step of detecting an error state of a connected printing device;
- a discriminating step of discriminating, when it is detected in said state detecting step that an error has occurred in the printing device, whether a type of video image being output to the display unit is a moving-picture broadcast program received by the receiving unit;
- a superimposing step of superimposing error information, which indicates that an error has occurred in the printing device, on the video image to be output to the display unit when it is detected in said state detecting step that an error has occurred in the printing device; and
- a control step of, if the type of video image being output to the display unit when it is detected in said state detecting step that an error has occurred in the printing device is discriminated as the moving-picture broadcast program in said discriminating step, starting to store, in the storage unit, the video image of the moving-picture broadcast program on which the error information is not superimposed by said superimposing step,
- wherein if the type of video image being output to the display unit when it is detected in said state detecting step that an error has occurred in the printing device is discriminated as a mixture of moving picture and still picture in said discriminating step, said control step (a) does not start to store, in the storage unit, the video image and (b) controls said superimposing step to superimpose the error information on a region of the video image in which the still picture is displayed and not on a region of the video image in which the moving picture is displayed, wherein the still picture and the moving picture are displayed together on a screen in separate regions.

10. The method according to claim 9, wherein if the type of video image being output to the display unit is discriminated in said discriminating step as a predetermined type different from the moving-picture broadcast program, said control step does not start to store, in the storage unit, the video image.

11. The method according to claim 10, wherein the predetermined type of video image includes at least one of (a) a still picture, (b) a data broadcast, and (c) a moving picture that can be paused.

12. The method according to claim 11, wherein in a case where the type of video image being output to the display unit is discriminated in said discriminating step as the data broadcast, said control step controls said superimposing step in such a manner that the error information is superimposed on a region of the video image in which a still picture is displayed.

13. The method according to claim 9, wherein said control step halts the superimposing of the error information by said superimposing step if an error recovery of the printing device is detected in said state detecting step.

14. The method according to claim 13, wherein if there is a video image of the moving-picture broadcast program that has been stored in the storage unit in response to the detection of the error in the printing device, said control step starts an output, to the display unit, of the video image of the moving-picture broadcast program that has been stored in the storage unit, if said state detecting step detects the error recovery of the printing device.

15. The method according to claim 13, wherein when said state detecting step detects that an error has occurred in the printing device and said discriminating step discriminates the type of video image being output to the display unit as the moving picture that can be paused, then said control step temporarily pauses the output of the video image by controlling a source device of the video image, and
- wherein if the error recovery of the printing device is detected in said state detecting step, said control step resumes the output of the video image from the source device that has been temporarily paused, by controlling the source device.

16. The method according to claim 9, wherein the still picture is displayed on a left side of the screen and the moving picture is displayed on the right side of the screen.

* * * * *